V. D. DUNAHUGH & H. CROUTHAMEL.
BAKER'S OVEN.
APPLICATION FILED NOV. 21, 1912.
1,086,034.
Patented Feb. 3, 1914.
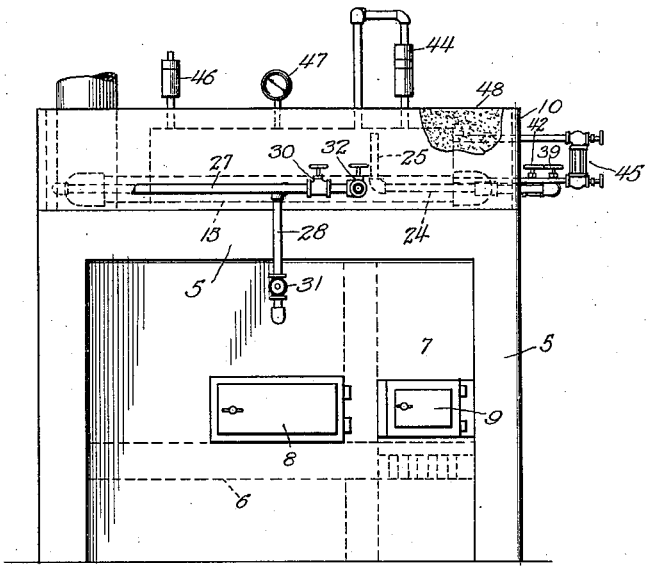
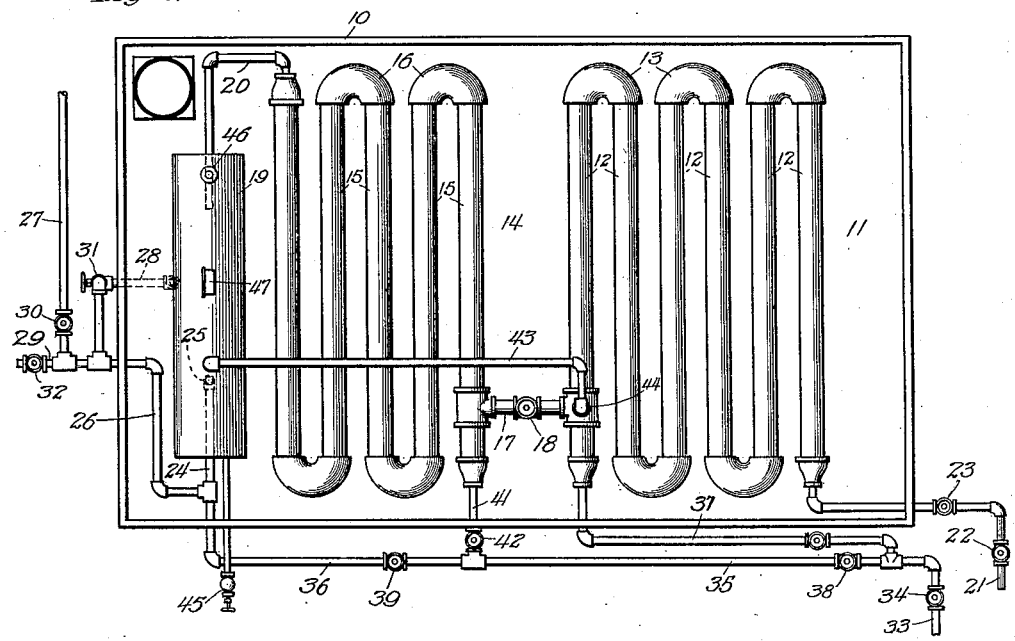

UNITED STATES PATENT OFFICE.

VICTOR D. DUNAHUGH AND HOWARD CROUTHAMEL, OF CHICAGO, ILLINOIS; SAID DUNAHUGH ASSIGNOR TO SAID CROUTHAMEL.

BAKER'S OVEN.

1,086,034. Specification of Letters Patent. Patented Feb. 3, 1914.

Application filed November 21, 1912. Serial No. 732,622.

*To all whom it may concern:*

Be it known that we, VICTOR D. DUNAHUGH and HOWARD CROUTHAMEL, citizens of the United States, residing at Chicago, in the county of Cook and State of Illinois, have invented certain new and useful Improvements in Bakers' Ovens, of which the following is a specification.

Our invention relates to improvements in bakers' ovens.

One of the objects of our invention is to heat water, and to convert it into steam by the utilization of the heat that is usually wasted, or not utilized in this manner, in ovens of this character.

Other and further objects of our invention will become readily apparent to persons skilled in the art from a consideration of the following description when taken in conjunction with the drawing, wherein:—

Figure 1 is a front elevation of a baker's oven. Fig. 2 is a top plan view of same.

In both views the reference characters indicate similar parts.

5 indicates generally the walls of an ordinary baker's oven, the bottom 6 of which extends partly across, and a vertical wall 7, shown in dotted lines in Fig. 1, divides the oven proper from the furnace.

8 is the door to the oven and 9 is the door to the furnace as usual in such structures.

In baking bread, it is usually customary to admit steam into the oven at or about the time that the dough is put into the oven for the purpose of baking, so as to permit the dough to rise before the crust is formed by the operation of dry heat of the oven. After a given length of time the steam is usually withdrawn or shut off and the bread is subsequently baked and browned by the dry heat of the oven.

It is usually customary to generate the required steam by some extraneous source. It is also a fact that in and around a baker's oven there is use for a considerable quantity of steam and hot water for the purpose of washing the utensils, the machinery, scrubbing the floors, and for such other like purposes.

In application of heat to a baker's oven there is considerable waste and our invention relates to means for conserving the waste heat and converting it into hot water and steam and to this end we provide, in an oven of the character described, a relatively thin wall 10 which may be made of cast iron, one course of brick, or the like, and which rises above the top horizontal wall of the oven 5 sufficiently to admit of the inclusion of certain steam coils,—such steam coils and tank as we employ in our system of steam generation.

In most of the modern bakers' ovens sand is used as an insulator of heat and a relatively thick wall of sand usually surrounds the walls of the baking oven. In such ovens, of this character, our invention is especially adapted for use of a steam drum and water coils and the connecting pipes and controlling instrumentalities, to be hereinafter described.

11 is a steam coil consisting of the pipes 12 and their respective manifolds 13. Another similar coil 14 is provided by the pipes 15 and the respective manifolds 16. These two coils are connected together, as by means of a pipe 17, controlled by a valve 18. The last pipe of the coil 14 is connected to a steam drum 19, as by pipe 20. The pipe 20 enters the lower portion of the steam drum below the water line and it is the means by which water and steam may be fed into the steam drum.

The coil 11 is located on top of the oven at the rear, or over that portion of the oven which is colder, normally, than the front hotter portion and this coil 11 serves as a means for heating the water before it enters the coil 14 which serves as a steam generator, the steam being transferred to and conserved or stored in the steam drum 19.

Cold water is fed into the heating coil 11 by means of the pipe 21 which is controlled by a globe valve 22 and a check valve 23 that seats with the pressure contained in the heating system.

Water may be pumped into the heating system, as by a boiler pump, customarily used in connection with steam boilers; or when the pressure of the system is lower than that of the pipes of the municipal water supply, the water may be fed directly into the system from said municipal pipes.

A pipe 24 enters the steam drum 19 and passes upwardly to a point near the top thereof, as at 25, into the steam space of said steam drum. A steam supply pipe 26 is connected to the steam pipe 24 and to this pipe are connected pipes 27, 28, and 29, controlled by valves 30, 31, and 32, respectively.

The pipe 27 may lead off to what is known as the proof box, in which a batch of dough is tested for its rising qualities before it is made into loaves and placed in the oven. The pipe 29 may lead to another point where it is necessary to supply steam from our improved steam generator.

Pipe 28 passes down in front of the oven and enters through the wall 5 into the oven proper near the furnace or near the hottest part of the oven and by means of this pipe and its control, the valve 31, steam may be admitted into the oven in order to provide a relatively moist atmosphere in the oven to surround the loaves or batches of dough that are to be placed therein during the time that they are undergoing the process of rising and before it becomes necessary to brown them.

After the loaves have risen sufficiently, in the manner described, the steam is turned off from the oven and the heated air is permitted to become dry by the absorption of the moisture produced by the steam, so as to properly brown the bread that is placed therein.

The use of steam and its introduction to an oven is old in the art; our invention having relation specifically to the manner in which the water is heated and the steam is generated by the heat that would be otherwise wasted from the baking oven.

A discharge pipe 33 controlled by valve 34 is adapted to take hot water from the coil 11 or steam from the coil 14 or the drum 19, as may be desired. This pipe is connected to the steam drum 19 by means of pipes 35, 36, and 24. It is also connected to the hot water coil 11 by means of pipe 37. It is sometimes desirous to use the coil 14 for steam and the coil 11 for hot water, quite independently. In that event the valve 18 would be closed after which hot water may be taken from the coil 11 through the pipes 37 and 33 independently of the coil 14, the valves 38 and 39 being closed and the valve 40 being open. Now if it is desirable to take steam from the coil 14 or the drum 19 while the valve 18 is closed, then the valves 38 and 39 may be open and steam will flow through the pipes 33, 35, and 36, its outflow being controlled by the valve 34.

A pipe 41 connects the discharge pipe 35 to the cold end of the coil 14, this connection being controlled by the globe valve 42. By this arrangement steam may be taken from the steam drum 19 through the pipes 35 and 36 or hot water from the cold end of the coil 14, as desired.

A pipe 43 is connected between the coil 11 and the steam drum 19, so that any steam that may be generated in the coil 11 may be directly carried by this pipe into the steam space of the steam drum. A blow-off valve 44 may be properly provided and jacketed and the jacket connected to this pipe 43, so that when the steam pressure rises in the coil 11 above a predetermined point, the valve will automatically open and permit the steam to pass through the pipe 43 into the steam drum 19. If desired, however, this blow-off valve may be omitted and the pipe 43 may be directly connected into the coil 11.

A water glass 45 is a means by which the quantity of water contained in the pipes 14 and in the steam drum 19 may be ascertained as usual in such structures. A pop-valve 46 is also located on the steam drum 19 and a steam gage 47 is connected to steam drum 19 and is a means for indicating the steam pressure.

After the steam drum and the coils have been placed upon the top of the oven, in a manner described, the space inclosed by the walls 10 is entirely filled with sand or other like similar material, as shown at 48, whereby the heat is retained so that it may be completely absorbed by our water heating and steam generating system.

While we have herein described a single embodiment of our invention for the purpose of clear disclosure, it is evident that changes may be made therein within the spirit and scope of the appended claims.

What we claim is:

1. A water-heating and steam-generating system for a baker's oven comprising, two flat coils, located on the top walls of an oven, the one above the front hottest and the other above the rear coolest portion thereof; a controllable connection between said coils; a feed-water pipe connected to the rear end of the rear coil, and a steam-supply pipe connected near the front end of the front coil.

2. A water-heating and steam-generating system for use in connection with a baker's oven, comprising two flat coils, located on the top wall of an oven, the one above the front hottest and the other above the rear coolest portion thereof; a controllable connection between said coils; a feed-water pipe connected to the rear end of the rear coil; a steam supply pipe connected near the front end of the front coil; a second delivery pipe, having branches connected to both of the coils; valves in both of the branches whereby either steam, hot water, or both may be delivered to the delivery pipe.

3. In a water-heating and steam-generating system for use in connection with a baker's oven having the grate located at the front end thereof, the combination, of a steam drum, located directly over the front end of the oven; two heating coils, the one positioned directly at the rear of the steam drum over the hottest portion of the oven and the other over the rear or coolest portion of the oven; a controllable connection between said coils; a connection between the front coil and the steam drum; a connection, between the front end of the rear coil and the top of the steam drum; a valved steam supply connection leading from the top of the said steam drum; a second supply pipe having branches leading into each of the said coils; and valves in the said branches to permit the drawing off of either steam, hot water, or both through the second delivery pipe.

4. In a water-heating and steam-generating system for use in connection with bakers' ovens having the furnace located under the front portion thereof, the combination, of a steam drum positioned in the top of the furnace over the front end; two coils positioned one directly at the rear of the steam drum over the hottest portion of the oven and the other over the rear cooler portion of the oven; a water-feed pipe, connected with the rear end of the rear coil; a valved connection between the front end of the rear coil and the rear end of the front coil; a connection, leading from the front end of the front coil into the said steam drum; a connection leading from the front end of the rear coil directly into the top of the said steam drum; a delivery pipe for supplying either steam, hot water, or both; three branches extending from the delivery pipe, the one to the front end of the rear coil, the second to the rear end of the front coil, the third to the top of the steam drum; and valves in each of the said branches substantially as and for the purpose set forth.

In testimony whereof we hereunto set our hands.

VICTOR D. DUNAHUGH.
HOWARD CROUTHAMEL.

In the presence of—
MARY Y. ALLEN,
W. LINN ALLEN.

---

Copies of this patent may be obtained for five cents each, by addressing the "Commissioner of Patents, Washington, D. C."